United States Patent [19]

Hays

[11] Patent Number: 4,994,186

[45] Date of Patent: Feb. 19, 1991

[54] CONTAINER FOR SEPARATING LIQUIDS

[76] Inventor: Bobby J. Hays, 3201½ Cooper Ct., Glenwood Springs, Colo. 81601-4411

[21] Appl. No.: 230,841

[22] Filed: Aug. 10, 1988

[51] Int. Cl.⁵ .............................................. B01D 23/00
[52] U.S. Cl. .................................... 210/464; 210/515; 210/518; 210/532.1
[58] Field of Search ................. 210/94, 513, 514, 515, 210/518, 532.1, 464, 467, 469; 222/189, 547, 564, 465.1

[56] References Cited

U.S. PATENT DOCUMENTS

| | | | |
|---|---|---|---|
| 250,798 | 12/1881 | Fusner | 222/189 |
| 844,929 | 2/1907 | Gilbert | 222/189 |
| 959,711 | 5/1910 | Burch et al. | 210/467 |
| 1,488,865 | 4/1924 | Castor | 210/514 |
| 1,598,230 | 8/1926 | Zirbel | 210/514 |
| 2,544,070 | 3/1951 | Daniels | 210/514 |
| 2,799,437 | 7/1957 | Jepson | 210/94 |

Primary Examiner—Richard V. Fisher
Assistant Examiner—Matthew Savage
Attorney, Agent, or Firm—Charles C. Corbin

[57] ABSTRACT

Disclosed is a can-like container adapted with internal structure which allows the container to be filled with a liquid combination of a major liquid component, such as gasoline, and a liquid contaminant such as water which is immiscible with and more dense than the major component, and which container structure allows the major liquid component to be poured from the container while the contaminant liquid is retained in an internal compartment of the container. There is an internal vertical divider wall that makes sealing connection with the top and side walls of the container and which has a lower edge at a set distance below the top of the container. An opening in the container top lies adjacent the top edge of the internal wall, to one side of that wall. The other side of the internal wall, in conjunction with portions of the container top and side walls forms a water trapping zone.

4 Claims, 2 Drawing Sheets

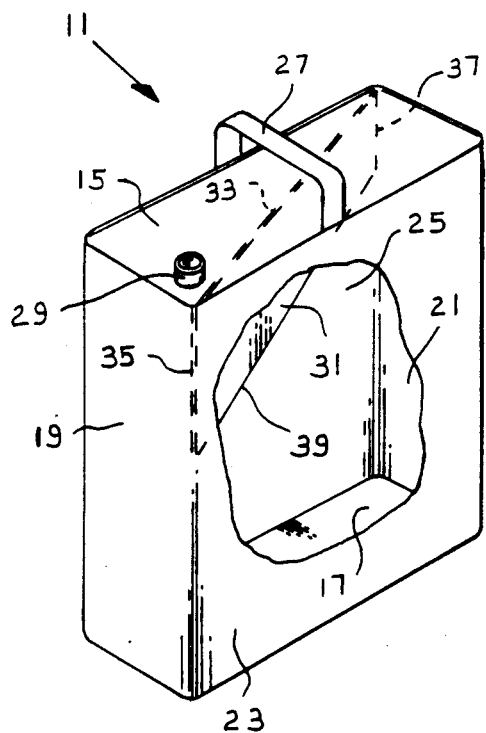
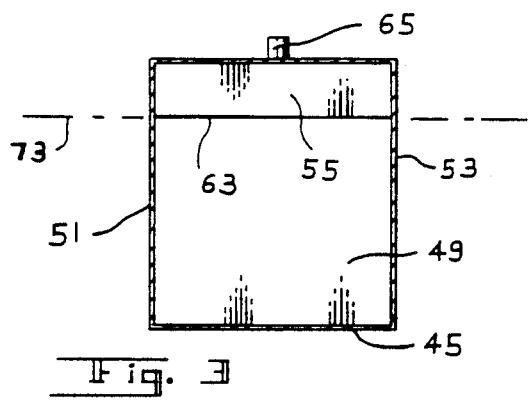
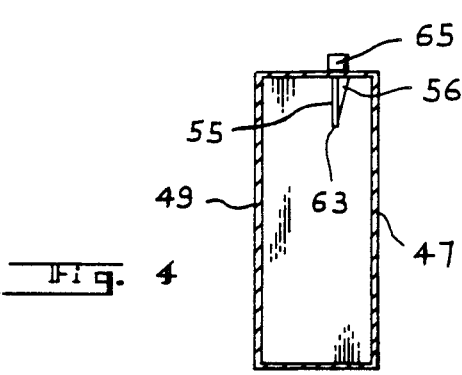
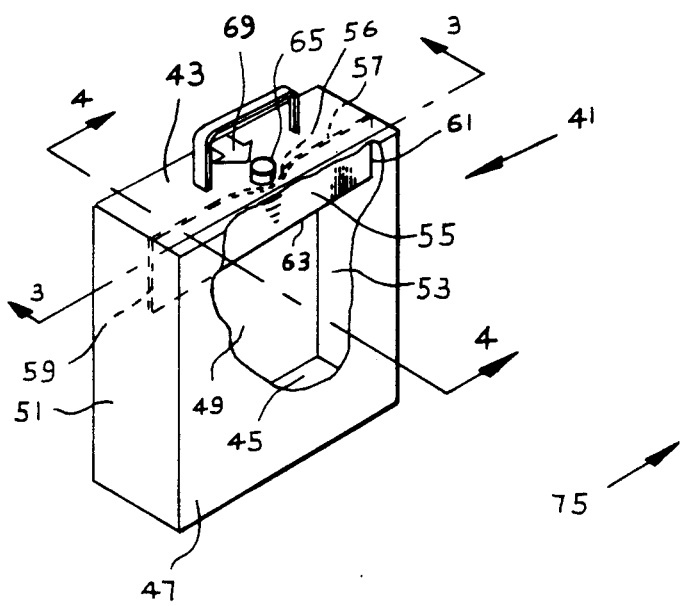
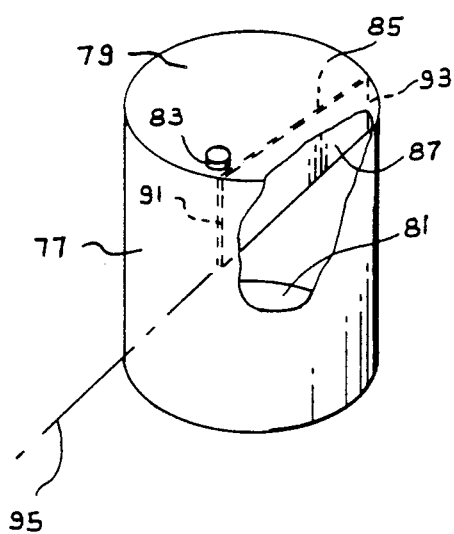

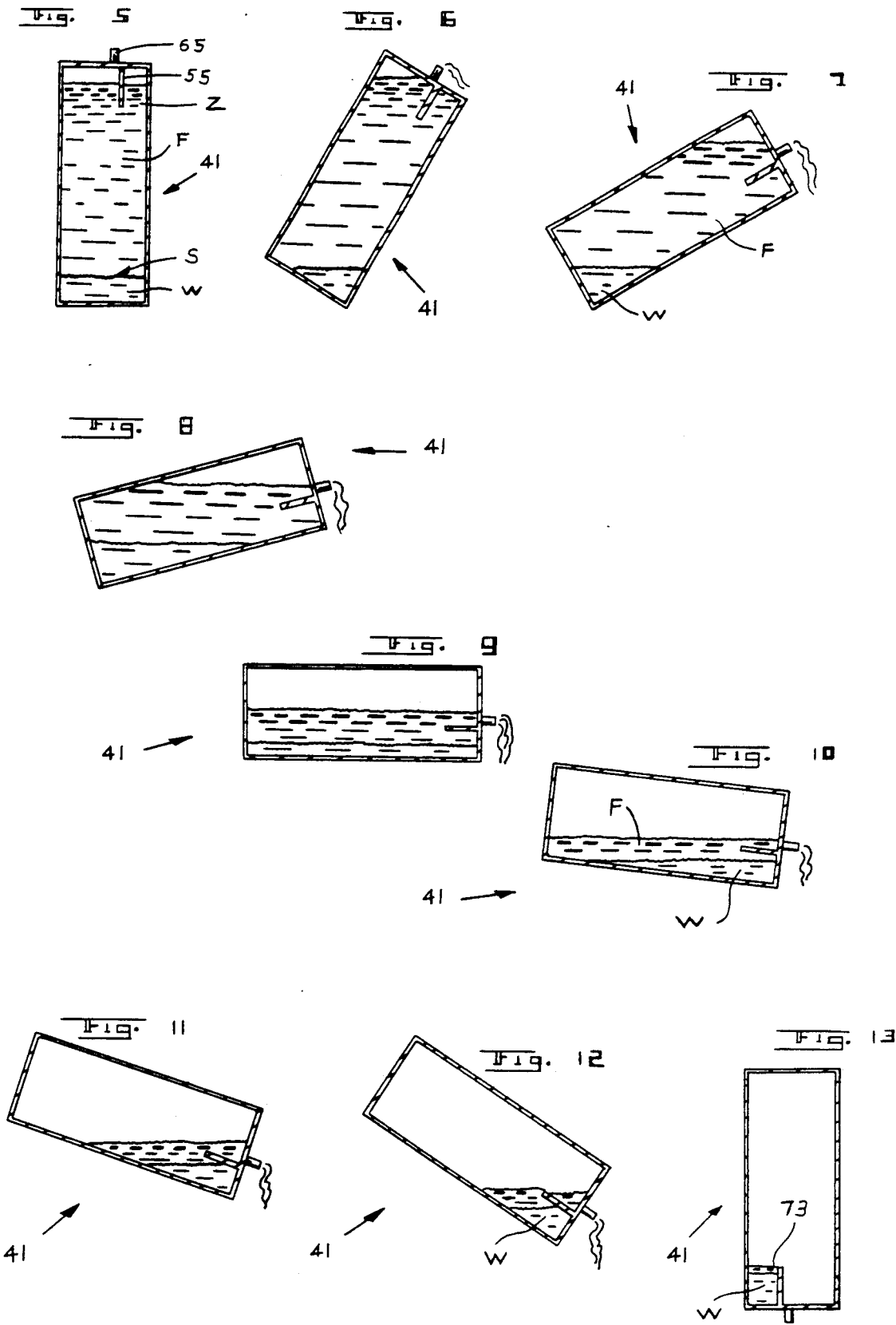

CONTAINER FOR SEPARATING LIQUIDS

BACKGROUND

The invention relates generally to containers having internal structure which allows a first liquid to be separated from a second liquid with which it is immiscible and of a different density.

The situation often arises wherein a quantity of liquid fuel such as gasoline or diesel fuel is contaminated with water. To use such contaminated fuel in an internal combustion engine can prevent it from starting, or cause a running engine to shut down, and/or lead to contamination of engine parts. The consequences can be costly, inconvenient and hazardous.

SUMMARY OF THE INVENTION

In view of the foregoing it is a general object of the present invention to provide means by which a quantity of water-contaminated fuel can be separated of its water component.

Another object of the invention is to provide a simple, inexpensive apparatus for separating the fuel component of a fuel and water combination, from the water component, where the fuel is less dense than water and immiscible therewith.

A further object is to provide apparatus for accomplishing the above-stated liquid separation, which apparatus is portable and easy to handle by one person.

These and other objects and advantages will be recognized by those of ordinary skill in the art by reference to the present invention as described in the following summary, detailed description and claims.

Accordingly the present invention provides a container for holding a liquid combination of a major liquid and a minor liquid that is immiscible with the major liquid and more dense than the major component, and which permits the major liquid to be dispensed while the minor component is retained in the container. The inventive container has an upper wall, a bottom and at least one vertically extending side wall. The invention features a downwardly extending internal wall which has an upper edge that forms a liquid impervious joint with the container upper wall, and side edges that join the container side walls in a liquid impervious manner. The lower edge of the internal wall lies at a predetermined distance below the container upper wall. The invention also features an opening in the container upper wall that is located adjacent the joint of internal wall and upper wall, and to one side of the internal wall. The other side of the internal wall and adjoining portions of the upper wall and side wall define a retention zone for the minor liquid component, such that when the container is rotated in the direction of the other side of the internal wall, generally about an axis along the lower edge of the internal wall, from an upright position towards an inverted position, the major liquid will be poured from the opening and the minor liquid will be trapped in the retainer zone. Variants of the invention include a generally rectangular shaped container, a cylindrical container, and a container having transparent side walls.

BRIEF DESCRIPTION OF DRAWINGS

FIG. 1 is a perspective view of a container according to the invention, with parts broken away for the sake of clarity;

FIG. 2 is a perspective view of another embodiment of the invention with parts broken away for clarity;

FIG. 3 is a sectional view taken along a vertical plane through the line 3—3 of FIG. 2;

FIG. 4 is a sectional view taken along a vertical plane through the line 4—4 of FIG. 2;

FIG. 5 is a sectional view similar to FIG. 4, and showing the container filled with a combination of two immiscible, different-density liquids;

FIGS. 6 through 13 show stages of progression of the pouring of a major liquid component from an inventive container; and FIG. 14 shows a cylindrical variant of a container according to the invention.

DETAILED DESCRIPTION

Referring now to the drawings, FIG. 1 shows an inventive container 11, having the outward appearance of a conventional fuel can with upper wall 15, bottom 17, slide walls 19 and 21, and front and back walls 23 and 25 respectively. There is a handle 27 and a spout 29 in the upper wall 15. A metal internal wall 31 is affixed to the inside of the container 11 by welding at its upper edge 33 and side edges 35 and 37. These welds are liquid impervious. The internal wall 31 extends vertically to its lower edge 39.

FIG. 2 shows a preferred embodiment of the invention comprising generally rectangular container 41 with upper wall 43, bottom 45, front wall 47, back wall 49, and side walls 51 and 53 respectively. An internal wall 55 is welded to the inside of container 41 along upper edge 57 and side edges 59 and 61. The lower edge 63 of internal wall 55 extends generally horizontally and straight and lies below the upper wall 43 at a distance which is determined in a manner to be described hereinafter. Note that spout 65 lies midway between side walls 51 and 53 and adjacent the upper edge 57 of wall 55 and to the rear side thereof. There is a trough-like curved portion 56 of wall 55 which will assist in funneling liquid to spout 65 when liquid is dispensed in a manner to be described. An external marking such as an arrow 69, is useful to indicate the direction in which container 41 must be rotated when liquid is dispensed therefrom.

The operation of the invention is best illustrated by reference to FIGS. 5-13 which show container 41 holding a fuel F that is contaminated by the presence of a quantity of water W. It is to be assumed that this liquid combination containing fuel to be salvaged has been gathered and poured into container 41 via spout 65. The quantity of water W may typically represent about 5% to 10% of the liquid combination. Since fuel F represents a typical liquid combustion engine fuel which is immiscible with water and less dense than water, it will lie above the smaller layer of water W, with demarcation surface S which it is evident will remain horizontal however the way container 41 is oriented In FIGS. 6-13 container 41 is rotated generally about the axis 73, shown in FIG. 3, which lies along the lower edge 63 of internal wall 55. By referring to the arrow 69, one is assured that rotation is in the proper direction. In FIG. 5 a water retention zone Z is shown to lie forward of the internal wall 55. It is evident that the capacity of zone Z is determined in part by the depth of internal wall 55 and its spacing from front wall 47. It is preferable that the capacity of zone Z be somewhat larger than the average anticipated volume of water W. FIGS. 6-13 show how the bulk of the fuel F is dispensed through spout 65, with FIG. 13 showing the complete retention of water W, along with a small quantity of fuel 73. Water W and the fuel remnant may then be poured from container 41 by rotating container 41 in the opposite direction, about the axis 73.

One variant of the invention, not shown, is similar to container 41, but is constructed of substantially transparent side walls and bottom. A suitably transparent plastic material that is chemically resistant to common liquid fields is used in this variant. This feature allows the user of the container to observe the inter-liquid demarcation surface during the dispensing operation and to follow the movement of the water into the retention zone.

The invention also includes a variant 75 shown in FIG. 14 that has a cylindrical configuration, with side wall 77, top 79, and bottom 81. Here the spout 83 is located near the junction of the edge of top 79 and the top edge 85 of internal wall 87. Note that the wall side edge 91 is longer than the side edge 93. It will be seen that this contributes to a fuel funneling effect as container 75 is rotated about the horizontal axis 95 that runs along the lower edge of internal wall 87.

While particular embodiments of the invention have been described herein it is not intended that the invention be limited thereto, since various modifications and changes may readily occur to those skilled in the art without departing from the invention. Therefore it is aimed to cover all such changes and modifications as fall within the true spirit and scope of the invention as defined in the claims which follow.

What is claimed is:

1. Container for holding a liquid combination of a liquid contaminant component, and a major liquid component that is immiscible with said contaminant component and less dense than said contaminant component, and for separating said liquid components, said container comprising:
   (a) top wall, bottom and at least one vertically extending side wall;
   (b) downwardly extending internal divider wall having a top edge that forms a liquid impervious joint with said top wall, and having first and second side edges that form liquid impervious joints with said at least one side wall, and a bottom edge that lies at a predetermined distance below said container top wall; and said top wall having an opening for passing liquids located adjacent the upper edge of said divider wall on one side of said divider wall, and the other side of said divider wall and adjacent portions of said container top and side wall defining a trapping chamber for said contaminant liquid component, and wherein said container has
   a generally rectangular front wall and opposed back wall, and generally rectangular first and second spaced-apart side walls, and wherein
   said divider wall is generally parallel to said container front wall.

2. Container as defined in claim 1 wherein said opening is located about midway between said container side walls.

3. Container is defined in claim 2 wherein the portion of said top edge of said divider wall that is adjacent said opening is offset in the direction of said trapping compartment.

4. Container for holding a liquid combination of a liquid contaminant component, and a major liquid component that is immiscible with said contaminant component and less dense than said contaminant component, and for separating said liquid components, said container comprising:
   (a) top wall, bottom and at least one vertically extending side wall;
   (b) downwardly extending internal divider wall having a top edge that forms a liquid impervious joint with said top wall, and having first and second side edges that form liquid impervious joints with said at least one side wall, and a bottom edge that lies at a predetermined distance below said container top wall; and said top wall having an opening for passing liquids located adjacent the upper edge of said divider wall on one side of said divider wall, and the other side of said divider wall and adjacent portions of said container top and side wall defining a trapping chamber for said contaminant liquid component; and
   wherein said opening is located adjacent an edge of said top wall, near said first side edge of said internal wall, and said first side edge is appreciable longer than said second side edge.

* * * * *